US008897748B2

(12) United States Patent
Bosan et al.

(10) Patent No.: US 8,897,748 B2
(45) Date of Patent: *Nov. 25, 2014

(54) SYSTEM AND METHOD FOR MONITORING MESSAGE USAGE

(75) Inventors: Sorel Bosan, Waterloo (CA); Janice Zima, Waterloo (CA); Sherryl Lee Lorraine Scott, Waterloo (CA)

(73) Assignee: BlackBerry Limited, Waterloo (CA)

( * ) Notice: Subject to any disclaimer, the term of this patent is extended or adjusted under 35 U.S.C. 154(b) by 207 days.

This patent is subject to a terminal disclaimer.

(21) Appl. No.: 13/614,324

(22) Filed: Sep. 13, 2012

(65) Prior Publication Data
US 2013/0012162 A1   Jan. 10, 2013

Related U.S. Application Data

(63) Continuation of application No. 12/394,481, filed on Feb. 27, 2009, now Pat. No. 8,295,804.

(51) Int. Cl.
*H04M 3/42* (2006.01)
*H04M 11/00* (2006.01)
*H04M 3/00* (2006.01)
*H04M 15/00* (2006.01)
*H04M 11/06* (2006.01)
*H04L 12/14* (2006.01)

(52) U.S. Cl.
CPC .... *H04M 11/066* (2013.01); *H04M 2215/0164* (2013.01); *H04M 2215/7826* (2013.01); *H04M 15/82* (2013.01); *H04M 15/8221* (2013.01); *H04M 15/00* (2013.01); *H04L 12/1403* (2013.01); *H04M 15/41* (2013.01); *H04M 2215/78* (2013.01); *H04L 12/1485* (2013.01); *H04L 12/14* (2013.01)
USPC ................. 455/406; 379/211.03; 379/207.16; 455/405; 455/418

(58) Field of Classification Search
CPC . H04L 12/14; H04L 12/1403; H04L 12/1485; H04M 11/066; H04M 15/00; H04M 15/41; H04M 15/82; H04M 15/8221; H04M 2215/78; H04M 2215/7826

USPC ............... 379/93.24, 142.04, 142.12, 142.13, 379/142.14, 142.15, 211.02, 212.01, 142, 379/211, 212, 207.16; 455/414, 414.1, 416, 455/417, 418; 705/14.73, 14.49
See application file for complete search history.

(56) References Cited

U.S. PATENT DOCUMENTS 6,584,188 B2 * 6/2003 Kim .......................... 379/211.02
6,856,673 B1    2/2005 Banks et al.
(Continued)

FOREIGN PATENT DOCUMENTS

CN    1418423 A    5/2003
EP    0946061      9/1999
(Continued)

OTHER PUBLICATIONS

English translation of the 2nd Office Action dated Dec. 5, 2012, which issued by the State Intellectual Property Office relating to corresponding Chinese Patent Application No. 201010135487.6.

(Continued)

*Primary Examiner* — Nizar Sivji
(74) *Attorney, Agent, or Firm* — Gowling Lafleur Henderson LLP (57) ABSTRACT

A computer implemented method for monitoring message usage on a communication device. An audible message may be outputted on the communication device in replacement of a pre-determined telephone tone. A duration parameter of outputting the audible message in replacement of the pre-determined telephone tone may be determined, and provided to a billing system for determining a compensation parameter.

19 Claims, 4 Drawing Sheets

(56) References Cited

U.S. PATENT DOCUMENTS

| | | | |
|---|---|---|---|
| 6,947,531 B1* | 9/2005 | Lewis et al. | 379/114.13 |
| 7,136,470 B1 | 11/2006 | Taylor et al. | |
| 7,227,929 B2 | 6/2007 | Seelig et al. | |
| 7,489,768 B1* | 2/2009 | Strietzel | 379/93.12 |
| 7,616,741 B2 | 11/2009 | Reynolds et al. | |
| 7,831,462 B2* | 11/2010 | Colson et al. | 705/14.49 |
| 8,204,200 B2* | 6/2012 | Wang et al. | 379/207.16 |
| 8,295,804 B2* | 10/2012 | Bosan et al. | 455/406 |
| 8,462,645 B1* | 6/2013 | Harb | 370/252 |
| 2003/0050837 A1* | 3/2003 | Kim | 705/14 |
| 2006/0215827 A1* | 9/2006 | Pfleging et al. | 379/142.02 |
| 2012/0289217 A1* | 11/2012 | Riemer et al. | 455/418 |
| 2013/0179275 A1* | 7/2013 | Harb | 705/14.73 |

FOREIGN PATENT DOCUMENTS

| | | |
|---|---|---|
| EP | 1517527 | 3/2005 |
| WO | 01/67718 A2 | 9/2001 |
| WO | WO 2007005917 | 1/2007 |
| WO | WO 2007068924 | 6/2007 |
| WO | WO 2009022023 | 2/2009 |

OTHER PUBLICATIONS

Canadian Official Action dated Sep. 25, 2014, issued by the Canadian Intellectual Property Office for corresponding Canadian Patent Application No. 2,694,187.

* cited by examiner

SYSTEM AND METHOD FOR MONITORING MESSAGE USAGE

CROSS-REFERENCE TO RELATED APPLICATIONS

This application is a continuation under 35 U.S.C. 120 of earlier filed nonprovisional application having application Ser. No. 12/394,481 filed Feb. 27, 2009, now Patent No. U.S. Pat. No. 8,295,804 B2, granted on Oct. 23, 2012, and incorporates by reference the disclosure of said earlier filed nonprovisional application in its entirety.

FIELD OF THE DISCLOSURE

The present disclosure relates generally to a system and method for monitoring message usage and specifically to a system and method for monitoring message usage for messages outputted in replacement of telephone tones on a communication device.

BACKGROUND OF THE DISCLOSURE

With the proliferation of communication devices, communication providers are constantly looking for new ways and mediums to communicate their messages, commercial or otherwise, to a large number of users.

BRIEF DESCRIPTION OF THE DRAWINGS

The disclosure will now be described by way of example only with reference to the following drawings in which.

DETAILED DESCRIPTION

Communication providers find it challenging to communicate their messages, commercial or otherwise. Once users become accustomed to a message or message venue, they may ignore or skip these messages. A related concern is that mobile or handheld communication devices may be sensitive to battery power depletion and thus may need to monitor and minimize the duration of the message presented.

Accordingly, there is a need for allowing and monitoring messages, including advertising messages, via venues such as communication devices, in such a way that users may be compensated for allowing the messages. The compensation scheme may be commensurate with predetermined criteria such as duration of the message presented. This provides motivation for users to listen to, or review the messages, and thus less likely to skip the messages.

Figure 1:
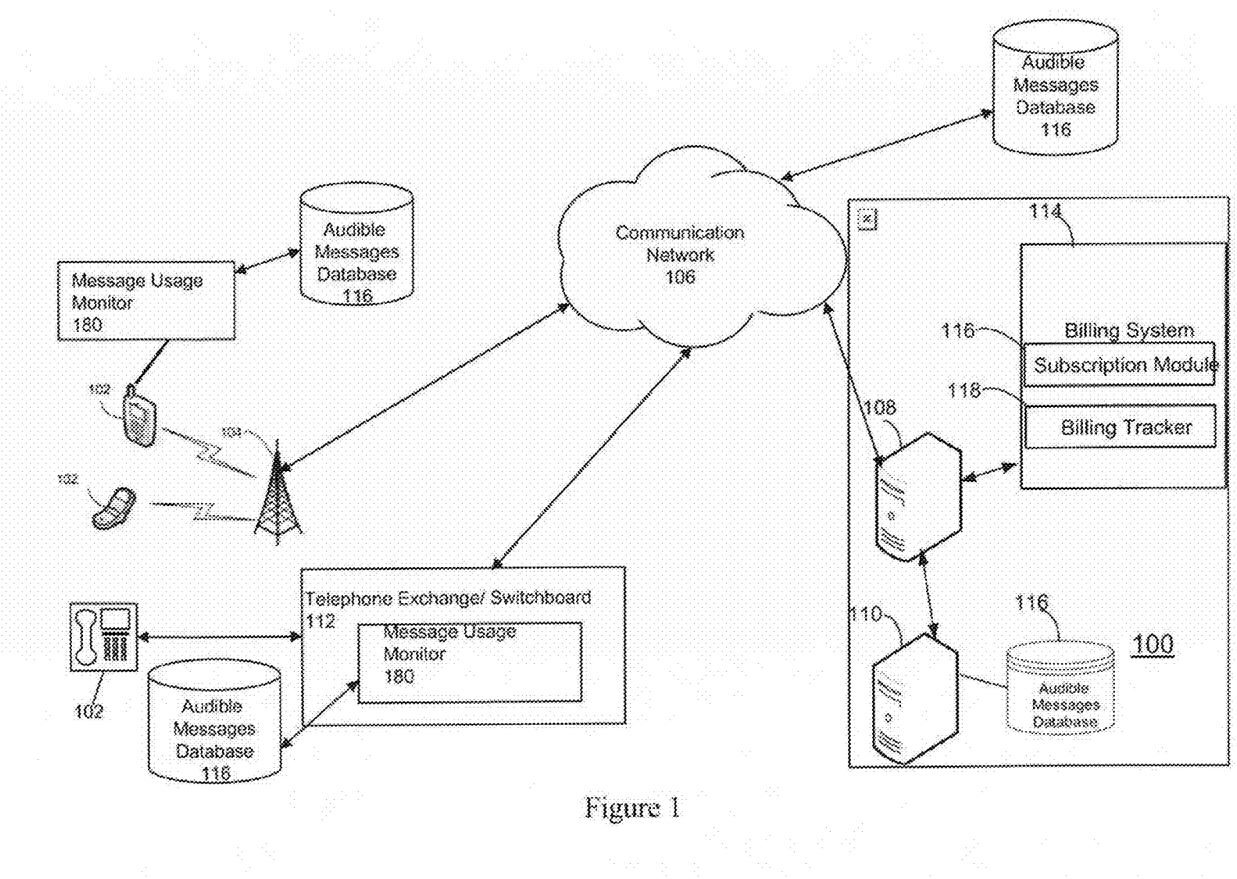
FIG. 1 is a block diagram illustrating a wireless communication system and a communication device which communicates within this system in accordance with one embodiment.

For convenience, like numerals in the description refer to like structures in the drawings. Referring to FIG. 1, a communication system is illustrated generally by numeral 100. The communication system 100 comprises a plurality of communication devices 102, a base station or antenna 104, a communication network 106, a carrier system 108, a billing system 114, and an enterprise message server 110 having an audible messages database 116. It will be understood by a person skilled in the art that the communication system 100 of FIG. 1 has been illustrated with a number of pertinent components for exemplary purposes only. Accordingly, a plurality of communication devices 102, base stations 104, communication networks 106, carrier systems 108, billing systems 114, enterprise message servers 110 and related audible messages database 116 may be envisaged as needed.

A computer implemented method for monitoring message usage on a communication device is provided, the method comprising: outputting an audible message on the communication device in replacement of a pre-determined telephone tone; determining a duration parameter of outputting the audible message in replacement of the pre-determined telephone tone; and providing the duration parameter to a billing system for determining a compensation parameter at least partly based on the duration parameter.

The method may further comprise: providing an acknowledgement option at a user interface of the communication device while outputting the audible message; receiving an acknowledgement indication of user attention at the user interface of the communication device; and providing the acknowledgement indication to the billing system for determining the compensation parameter.

In another embodiment, the method may further comprise receiving the audible message from a remote server and storing the audible message for output on the communication device.

In one embodiment, the communication device may be a caller communication device initiating a call to a recipient communication device. The method may further comprise outputting the audible message at the caller communication device upon detecting an off-hook tone at the caller communication device.

In another embodiment, the method may comprise outputting the audible at the caller communication device upon detecting a call activation action at the caller communication device.

Further, the audible message may be outputted at the caller communication device at least until detection of a voice response from the recipient communication device.

The audible message, in one embodiment, may be an audible advertising message.

In another embodiment, the communication device may be a recipient communication device receiving an incoming call from a caller communication device. Here, the method may further comprise outputting the audible message in replacement of an incoming call ring tone at the recipient communication device. The audible message may be outputted at least until the recipient device establishes a call connection with the caller communication device.

In an alternate embodiment, the audible message may be outputted at the recipient device for a pre-determined number of ring equivalents.

Yet further, the method may comprise: detecting location information of the communication device while outputting the audible message; and providing the location information to the billing system for determining the compensation parameter at least partly based on a pre-determined location criterion.

In another embodiment, the method further comprises outputting the audible message in a local language depending on the detected location of the communication device.

In another embodiment, the method may comprise: detecting mobility information of the communication device, while outputting the audible message, the mobility information indicating whether the communication device is stationary or moving; and providing the mobility information to the billing system for determining the compensation parameter at least partly based on the mobility information.

Also provided is a communication device comprising: a processor and a memory coupled thereto, the memory storing instructions and data configuring the processor to: output an audible message on the communication device in replacement of a pre-determined telephone tone; determine a duration parameter of outputting the audible message in replacement of the pre-determined telephone tone; and provide the duration parameter to a billing system for determining a compensation parameter at least partly based on the duration parameter.

The communication device may be selected from the group of communication devices consisting of a wireless communication device, a landline telephone and a voice-enabled laptop computer.

A computer readable memory comprising instructions is provided, which, when executed on a computer, cause the computer to: output an audible message on the communication device in replacement of a pre-determined telephone tone; determine a duration parameter of outputting the audible message in replacement of the pre-determined telephone tone; and provide the duration parameter to a billing system for determining a compensation parameter at least partly based on the duration parameter.

Also provided is a computer implemented system for monitoring message usage on a communication device, the system comprising: a message database accessible to the communication device for outputting an audible message at the communication device in replacement of a pre-determined telephone tone; an output duration monitor for determining a duration parameter of outputting the audible message in replacement of the pre-determined telephone tone; and a billing system for determining a compensation parameter at least partly based on the duration parameter.

In one embodiment of the computer implemented system, the communication device is a recipient communication device. In a further embodiment, the pre-determined telephone tone may be a telephone call ring tone.

In another embodiment, the communication device may be a caller communication device. The pre-determined telephone tone may be selected from the group consisting of: an off-hook tone, a number busy tone, a network busy tone, a ring back tone, and a dual tone multiple frequencies (DTMF) tone.

The communication devices 102 are in communication with one another via the communication network 106 and the base station 104. Accordingly, the communication network 106 may include several components such as a wireless network, a relay, a corporate server and/or a mobile data server (MDS) for relaying data between the base station 104 and the carrier system 108. An example of a corporate server is the BlackBerry Enterprise Server provided by Research In Motion Ltd. The communication network may also support Voice over IP functionality for telephone calls, for both landline and wireless based communication devices 102.

As will be described, the communication system 100 is configured to provide one or more audible messages to communication devices 102 in replacement of standard telephone tones outputted at the communication device 102. Further, the communication system 100 may be configured to track usage of the messages (i.e. according to detecting pre-determined parameters such as length of time that the audible message is played on the communication device 102) and to provide compensation to the user(s) of the communication device 102 as determined by the billing system 114 in response to allowing the audible message(s) to be outputted on the communication device 102. For example, financial compensation may be provided according to the length of time of playing the message in lieu of an incoming call ring tone. As will also be described, the audible messages may be provided either directly (i.e. via the enterprise message server 110) or indirectly (i.e. via the carrier system 108) to the communication device 102.

Wireless communication services are typically provided on a service contract basis where the communication device user enters a service contract with a wireless carrier to have wireless service provided to the communication device 102. Accordingly, the carrier system 108 may be configured to store information such as the communication device 102 user(s) name and billing information, wireless service plan, equipment type, and any other pertinent information to facilitate wireless communication for the communication device 102. The carrier system 108 is a further coupled for communication with carrier infrastructure including a billing system 114. The billing system 114 comprises a subscription module 116, and a billing tracker 118. Subscription module 116 stores information related to communication services for which the communication device is enrolled. The subscription information stored in the subscription module 116 may be updated and/or modified by a user of the communication device 102, by the communication system 100 administrator or by an administrator/user of the carrier system 108.

In one embodiment, the subscription module 116 may further be configured to track and store subscription information related to which communication devices 102 are subscribed to receive audible messages in replacement of standard telephone tones. Typically, when a phone call is initiated and placed between communication devices, including cellular telephones, two-way pagers, wired/fixed telephones (i.e. PSTN telephones), or a voice-call enabled personal computer or laptop computer, a number of standard or pre-determined telephone tones may be generated at each of the caller communication device and recipient communication device involved in the call. Various tones may be generated when a call is initiated, such as when the caller picks up the phone or the phone goes "off-hook", when the caller is dialing the recipient communication device, and yet after dialing the number of the recipient communication device when an attempted call connection is made.

In a wired telephone, an "off-hook" dial-tone may typically be generated by the telephone exchange system/switchboard and heard at the caller's telephone to indicate that the exchange is properly functioning and that it is available to accept calls from the wired telephone. Typically, when the user begins to press the digits on a keypad of the telephone, the off-hook tone is stopped, and during dialing, for each number or symbol of a telephone keypad that is pressed, a dual tone multiple frequencies (DTMF) tone is generated and heard at the caller's telephone. DTMF tones generally consist of two pure frequencies and are used for telephone signalling between the switchboard and the caller device. For example, the DTMF tones are used for instructing a telephone switching system of the telephone number to be dialed, whereby depressing a single key on a telephone keypad produces two pure sinusoidal tones.

Other tones may be generated once the caller has dialed the desired telephone number and attempted a call connection to the recipient telephone device being called. Such connection tones indicating the status of the attempted connection between two communication devices/telephones may include, but are not limited to, ring-back tones, line busy tone, the network busy tone and "invalid number dialed" tone.

In the case of wireless communication devices, such as digital communication-based mobile phones, no dial-tone may be generated when dialing. Rather, the user attempts a call activation action, such as dialing the recipient phone number and activating a "SEND" or "CALL" function, or other similar button or switch, to go off-hook and attempt a call connection with the recipient device. The user may however, hear a DTMF tone, or dialing tone, as each key representing a digit of the recipient telephone number is depressed. Once the attempted call connection is successfully made, the user may also hear a connection tone as discussed above.

The billing tracker 118 is configured to track and store billing information for the communication device 102 based on the services plan and usage of various services available to the communication device 102. In one embodiment, the billing tracker 118 is further configured to determine and provide financial compensation to the user(s) of the communication device 102 based on allowing the message to be outputted on the communication device 102 instead of an output ring tone. In one embodiment, the financial compensation is based on the amount of time that the user of the communication device 102 has allowed the message to be outputted on the communication device 102.

Communication device 102 may be configured to monitor message usage for one or more messages played either during an incoming call at a recipient communication device 102, or at a caller communication device 102 during an attempted call to a recipient device. Communication device 102 may further be configured to provide the message usage information to the billing system 114 for determining appropriate compensation for the account associated with the communication device 102. A duration parameter measuring message usage may be based on determining the length of time that the message is outputted on the communication device 102. Or alternatively, the duration parameter may be based on a number of rings. More specifically, how many "ring equivalents" does a user allow the phone to play the audible message upon receiving an incoming call, before answering the call on the communication device 102.

In a further embodiment, tracking message usage may comprise monitoring various parameters for verification that the user has actually listened to, paid attention to, or is actually accompanied by the communication device 102. For example, determining whether the user has actually listened to or paid attention to the message outputted, may include receiving an acknowledgement from the user of the communication device 102 while the message is playing. Accordingly, in the present embodiment, the billing tracker 118 may provide compensation if it is verified that the user has actually listened to the audible messages according to the pre-determined verification and acknowledgement parameters. For example, a user of the communication device 102 may be automatically requested at predetermined time intervals to input one or more predetermined keys on the keyboard 232 or other predetermined inputs on the communication device 102 to acknowledge that they are listening to the message being played. Other measures for determining whether the user is actually listening to the messages will also be described.

Referring again to FIG. 1, the carrier system 108 is coupled to the enterprise message server 110 having an audible messages database 116. The audible messages database 116 stores a plurality of messages thereon for access by the enterprise message server 110. The enterprise message server 110 may be further configured to provide audible messages to the communication device 102 either on an as-needed basis (i.e. message provided to the communication device 102 when there is an indication of an incoming call to the communication device 102), or alternately, one or more messages may be downloaded by the communication device 102 as desired (i.e. via the web browser of the communication device 102) and stored on the communication device 102 for use in any subsequent received calls. That is, for message customization purposes, the user may browse one or more web pages associated with the enterprise message server 110 to select and download the desired audible message to be played upon receiving an incoming call.

It will be appreciated by a person of ordinary skill in the art that the communication system 100 described herein is exemplary and that changes may be made to one or more components to accommodate different network configurations without affecting the scope of the disclosure described and claimed herein. Further, although the present description specifically recites a communication device 102, it will be appreciated that other types of devices, including both wired and wireless devices, may similarly be employed.

Figure 2:
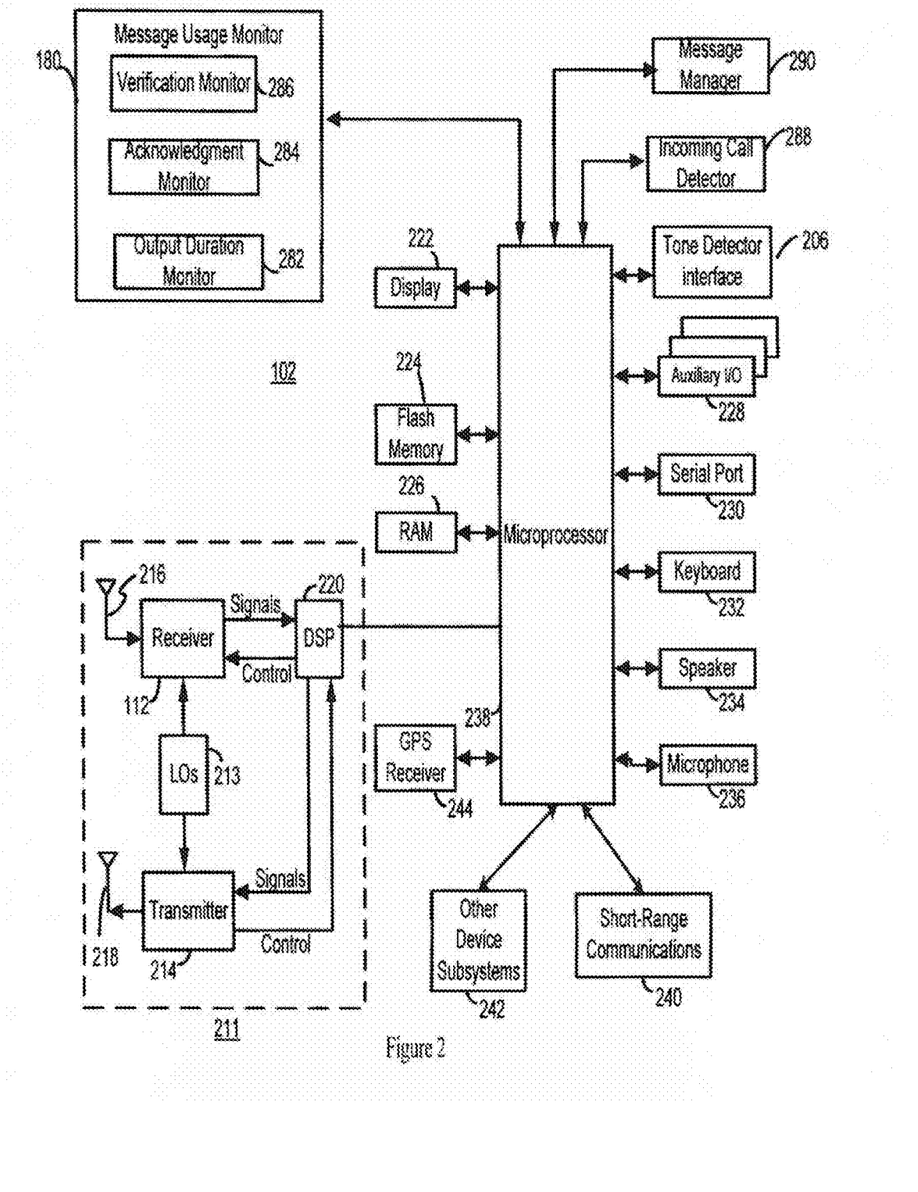
FIG. 2 is an exemplary block diagram of the communication device of FIG. 1.

Referring to FIG. 2, components of the communication device 102 are illustrated in greater detail. The communication device 102 is often a two-way communication device having both voice and data communication capabilities, including the capability to communicate with other computer systems. Depending on the functionality provided by the communication device 102, it may be referred to as a data messaging device, a two-way pager, a cellular telephone with data messaging capabilities, a wireless Internet appliance, or a data communication device.

The communication device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which communication device 102 is intended to operate.

The communication device 102 includes a microprocessor 238 which controls general operation of the communication device 102. The microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240 such as BLUETOOTH (Bluetooth™) for example, and any other device subsystems or peripheral devices generally designated at 242. The communication device 102 may also include a positioning device 244, such as a GPS receiver for example, for receiving positioning information. As will be described, the GPS receiver may be configured to detect and provide location information in order to determine if the location of the communication device 102 meets pre-determined location criteria (i.e. criteria set by the billing system 114). For example, based on whether the pre-determined location information is met, the billing system 114 may then determine whether to provide financial compensation for the audible message outputted on the communication device 102.

Operating system software used by the microprocessor 238 may be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, may enable execution of software applications on the communication device 102. A predetermined set of applications, which control basic device operations, is installed on the communication device 102 during its manufacture. These basic operations typically include data and voice communication applications, for example. Additionally, applications may also be loaded onto the communication device 102 through the network 106, an auxiliary I/O subsystem 228, serial port 230, short-range communications subsystem 240, or any other suitable subsystem 242, and installed by a user in RAM 226, or the persistent store 224, for execution by the microprocessor 238. Such flexibility in application installation increases the functionality of the communication device 102 and may provide enhanced on-device features, communication-related features, or both.

The display 222 is used to visually present an application's graphical user interface (GUI) to the user. The user can manipulate application data by modifying information on the GUI using an input device such as the keyboard 232 for example. Depending on the type of communication device 102, the user may have access to other types of input devices, such as, for example, a scroll wheel, trackball, light pen or touch sensitive screen.

Therefore, in accordance with an embodiment, the communication device 102 may further comprise a message usage monitor 180. The message usage monitor 180 may be a software solution that is included as part of the operating system or as an application. As illustrated in FIG. 2, the message usage monitor 180 may comprise an output duration monitor 282 that detects a duration parameter whenever an audible message is outputted or played on the communication device 102 in lieu of a standard telephone tone, including a ring tone when an incoming call is received. Output duration monitor 282 may communicate the duration parameter representing length of time that the audible message has been played on the communication device 102, or the number of "ring equivalents" that the user has allowed the message to play in lieu of the standard ring tone, to the billing system 114. A number of "ring equivalents" may equate to time duration, since typically the duration of a ring, as well as the period between rings, are pre-determined intervals of time. In one example, the user may desire to increase the financial compensation amount by allowing the message to be played for a certain length of time before answering the received call. Accordingly, based on the message output duration information, the billing system 114 may determine the appropriate amount of financial compensation to be provided to the user of the communication device 102.

In one embodiment, the message usage monitor 180 may further comprise an acknowledgement monitor 284 that monitors user input(s) for pre-determined input(s) (i.e. inputted using an input device such as the keyboard 232) on the communication device 102 indicating an acknowledgement that the user is listening to the output message played during an incoming call. For example, the billing system 114 may provide financial compensation for the billing account associated with the communication device 102 only if a pre-determined acknowledgement is received from the user (i.e. via keyboard 232) at pre-determined time intervals while the message is being outputted on the communication device 102 indicating that the user is listening to the output message. Or in another embodiment, billing system 114 may provide financial compensation at a higher level (than it normally would) if the pre-determined acknowledgement is received from the user, indicating attention to the message.

To prevent any potential abuse of the compensation scheme or benefits scheme, such as a scenario where a user might automatically call their own phone number repeatedly to have the message played repeatedly, in order to increase compensation/benefits, some modifications may be appropriately deployed. One way might be to put a cap on compensation or benefits from a given calling party number. Another way might be to put a cap on compensation or benefits within a given time period.

In a further embodiment, the message usage monitor 180 provides an indication of whether other pre-determined criteria for providing financial compensation have been met (i.e. based on one or more acknowledgement inputs received from the communication device 102 while the audible message is being presented). Message usage monitor 180 may further comprise a verification monitor 286. The verification monitor 286 detects additional pre-determined parameters that are used to confirm and/or satisfy the billing system 114 that the user has listened to the output audible message. For example, the verification monitor 286 may determine whether the location of the communication device 102 (i.e. as detected via the GPS receiver 244) is within a pre-determined range and thus financial compensation should be provided to the user for allowing the audible message to be outputted on the communication device 102. For example, the billing system 114 may only provide financial compensation for the audible message if it is played while the user of the communication device 102 is a pre-determined distance from its "home" or other pre-set location. Accordingly the verification monitor 286 determines whether the location information meets pre-determined criteria to provide financial compensation. The verification monitor 286 may otherwise be configured to detect whether other pre-determined parameters have been met and to provide an indication of same to the billing system 114 for subsequent financial compensation accordingly.

Location information as determined by verification monitor 286 may be used in ways other than for billing purposes. For instance, when travelling, an audible message may be more appropriately rendered in the local language. In such exemplary embodiment, the audible message may be outputted to the user in any one of several languages depending on the location of communication device 102. Further, a user may be provided with the option to override that local language functionality so that audible messages are only rendered in a user-preferred language.

Accordingly, in one embodiment, the billing system 114 pre-defines the expected parameters or criteria that should be met in order to provide financial compensation. The message usage monitor 180 compares the detected parameters (i.e. provided via any of the verification monitor 286, the acknowledgement monitor 284, or the output duration monitor 282) to the expected pre-determined parameter values and provides an indication of whether the detected parameters meet the criteria set by the expected pre-determined parameters to the billing system 114 for subsequent financial compensation. Alternatively, in one embodiment, the message usage monitor 180 provides the detected parameters (i.e. provided via any of the verification monitor 286 and acknowledgement monitor 284 and the output duration monitor 282) to the billing system 114 for subsequently determining whether the detected parameters meet the expected criteria (i.e. expected location information for providing financial compensation). Based on the detected parameters provided by the message usage monitor 180, the billing system 114 determines an appropriate compensation parameter, which may include, but are not necessarily limited to, direct (such as cash rebates) or indirect (such as billing credits) financial compensation.

Referring again to FIG. 2, the communication device 102 further comprises an incoming call detector 288, a message manager 290, and a tone detector interface 206. The incoming call detector 288, the message manager 290 and the tone detector interface 206 may be a software solution that is included as part of the operating system or as an application of the communication device 102. The incoming call detector 288 detects when an incoming call is received on the communication device 102, and triggers the message manager 290 to output/play the audible messages on the communication device 102 in replacement of an incoming call ring tone. The tone detector interface 206 detects any of the standard or pre-determined telephone tones discussed earlier. The message manager 290 is further configured to notify the message usage monitor 180 that audible messages are being outputted on the communication device and thereby initiate tracking of one or more pre-determined parameters by at least one of the output duration monitor 282, the acknowledgement monitor 284 and the verification monitor 286. Additionally, the message manager 290 may be configured to retrieve messages from the audible messages database 116 of the enterprise message server 110 as needed. Messages may also be pushed from enterprise message server 110 and pre-loaded and stored onto the memory (i.e. flash memory 224 or RAM 226) of communication device 102 for subsequent access.

Figure 3:
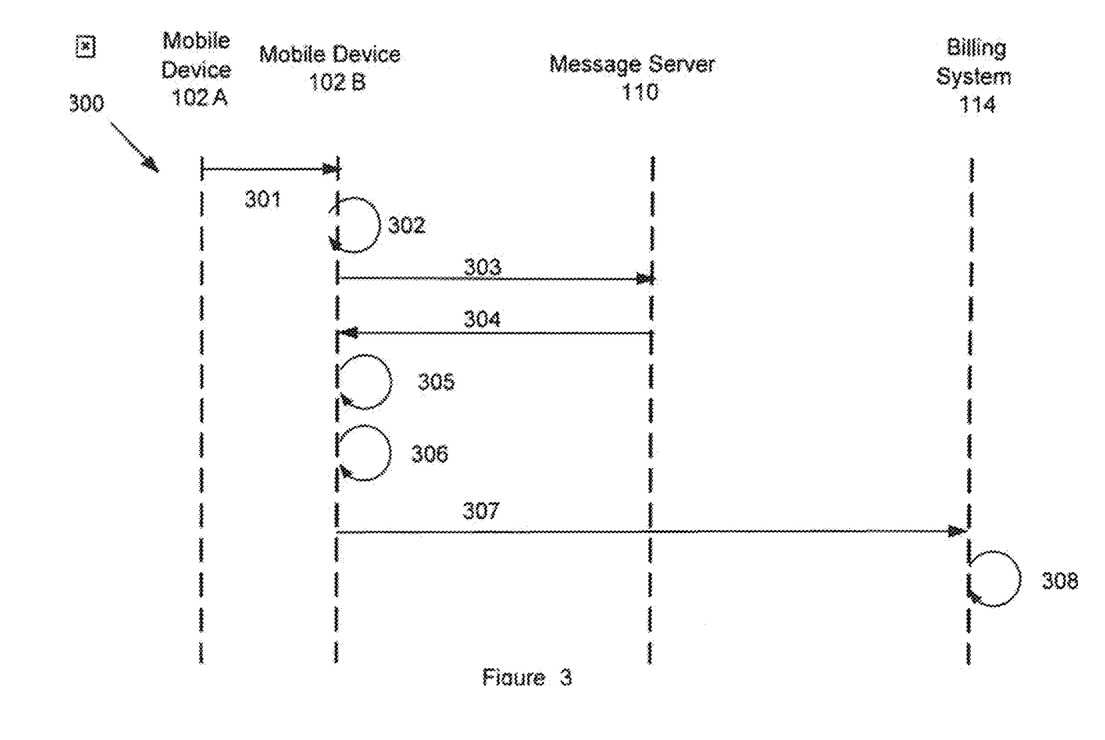
FIG. 3 illustrates an exemplary flow of interactions among components of the system of FIG. 1 for monitoring message usage of a recipient communication device of FIG. 1.

Referring now to FIG. 3, shown is an exemplary flow of interactions between components of system 100 illustrated in FIG. 1 for monitoring message usage according to pre-defined parameters when providing messages in replacement of incoming call ring tones at a recipient device. FIG. 3 illustrates telephone communications between a caller communication device 102A, the call-initiating device, and a second communication device 102B, the recipient device. Recipient device 102B is the recipient of the call initiated by the caller device 102A. Devices 102A and 102B are also generally referred to as communication devices 102 herein.

At 301, a call is placed from the caller communication device 102A to the recipient communication device 102B. At 302, the incoming call detector 288 of the recipient communication device 102B detects an incoming call. Next, subscription module 116 may verify subscription information to determine whether the recipient communication device 102B is currently subscribed to the service for receiving audible messages in replacement of an incoming call ring tone, and to receive associated compensation. If the recipient communication device 102B is subscribed to the message for ring tone service, the incoming call detector 288 then triggers the message manager 290 to proceed with the retrieval and substitution of the audible message in lieu of the ring tones typically outputted to indicate an incoming call. Otherwise, the standard ring tone is played.

Proceeding with reference to the embodiment illustrated in FIG. 3, the message manager 290 of the recipient communication device 102B requests messages from the enterprise message server 110 at step 303. At step 304, the message manager 290 of the recipient communication device 102B receives one or more audible messages.

Alternatively, in one embodiment not illustrated, the communication device 102B may have previously received audible messages pushed from enterprise message server 110, for storage thereon and for subsequent access by the message manager 290 when triggered.

At step 305, the message manager 290 outputs the audible message on the recipient communication device 102B in lieu of an incoming call ring tone. Accordingly, the message may be played on the recipient communication device 102B until the incoming call is answered.

In an alternate embodiment, a user may customize the number of rings that may accompany an incoming call on device 102B, and accordingly, the message may be played for a duration equivalent to the customized number of rings. In this situation, a user might be motivated to customize the communication device to allow a reduced number of rings before answering, possibly for battery power depletion considerations. In such a case, each ring may be replaced by a separate audible message, for example in the form of a commercial "jingle", such as a musical announcement associated with the message source, for example, "Things go better with Coke™", outputted at the recipient communication device 102B. With each "jingle" possibly representing different commercial promotions, and each "jingle" potentially being a complete and separate commercial message in itself, for instance, it becomes possible to have multiple complete and distinct messages, even though only a reduced number of rings may be allowed by a user, for battery power depletion considerations.

At step 306, the message usage monitor 180 may monitor and detect various pre-determined parameters associated with the message usage. In one embodiment, at step 306, the output duration monitor 282 detects the duration of the message played on the recipient communication device 102B. At step 307, the duration parameter detected is provided to billing system 114.

In a further embodiment, at step 306, the acknowledgement monitor 284 requests and detects acknowledgements (i.e. requesting the user to input one or more keys, or select an option on the interface of the communication device) while the audible message is being played to verify that the user is listening to the output audible message for at least a duration of the message. In yet a further embodiment, the verification monitor 286 may detect additional pre-determined parameters as selected by the billing system 114 to ensure that compensation is appropriately credited to the account of communication device 102B. The additional pre-determined parameters may include detecting the location of the recipient communication device 102B, such that compensation is provided based on pre-determined locations of the recipient communication device 102B, as discussed earlier.

Other pre-determined parameters that may be detected by the verification monitor 286 may include detection of mobility of the recipient communication device 102B while the message is being played. For example, the billing system 114 may provide financial compensation if the communication device 102 is not stationary or is otherwise moving while the message is being played. This may be used to indicate that the user of the recipient communication device 102B is moving along with the device and as such possesses the device while the message is being played. This avoids providing financial compensation in a case where a user has stored the recipient communication device 102B in a separate location and does not have possession of the device.

In another example, the verification monitor 286 may detect whether the ringer settings or notification settings of the recipient communication device 102B have been set to a silent mode or vibrate mode. According to this embodiment, the billing system 114 may be configured to provide financial compensation for listening to the audible message only if the ringer is not set to an inaudible mode.

Referring still to FIG. 3, at step 308, the billing system 114 determines compensation based on the message duration and other message usage parameters provided by the message usage monitor 180. The compensation provided may include reducing the billing charges, for instance, the monthly charges or the per minute charges associated with a call, or providing financial credit for future calls associated with the account of recipient communication device 102B. Other measures for providing compensation or benefits to a user may be envisaged by a person skilled in the art.

Figure 4:
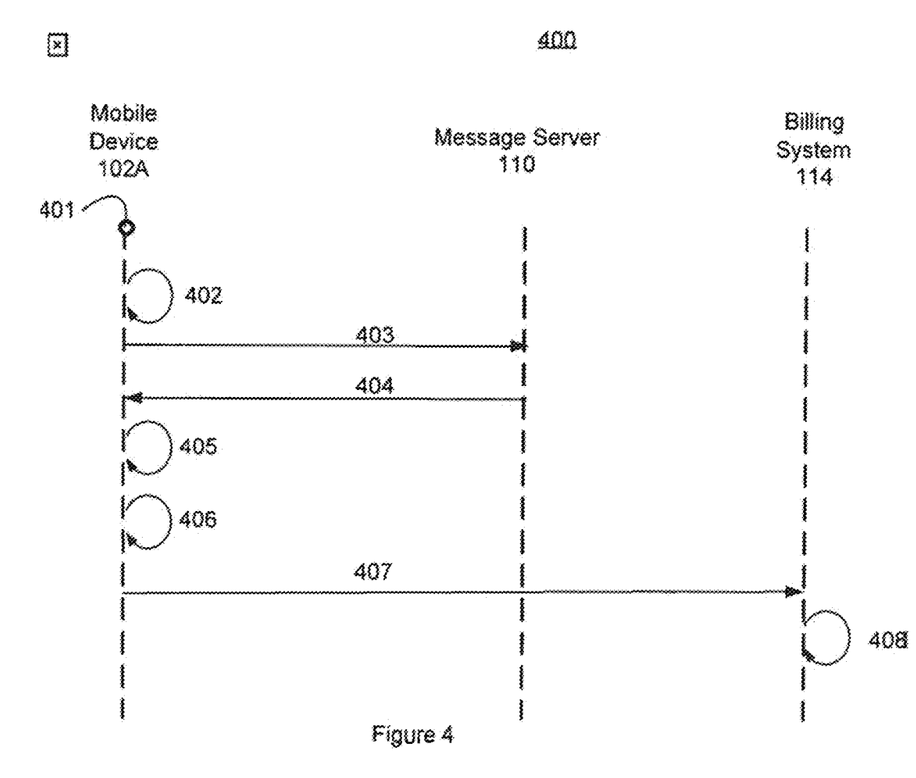
FIG. 4 illustrates an exemplary flow of interactions among components of the system of FIG. 1 for monitoring message usage of a caller communication device of FIG. 1.

Referring now to FIG. 4, shown is an exemplary flow of interactions between components of system 100 illustrated in FIG. 1 for monitoring message usage according to pre-defined parameters when providing messages in replacement of a telephone tone at a call-initiating, or caller, communication device 102A, shown in numeral 400.

At 401, a call is initiated at the caller communication device 102A to the recipient communication device 102B, in the case of a mobile or cell phone typically by activating the SEND or CALL function. In step 402, the tone detector interface 206 of caller communication device 102A detects a telephone tone at communication device 102A. Depending on the call status of the attempted call connection, telephone tones such a line busy, invalid recipient number, network busy or a ring-back tone may be typically detected.

At step 403, the tone detector interface 206 then may trigger the message manager 290 to proceed with the retrieval of the audible message from the enterprise message server 110, in lieu of the telephone tone typically outputted to the caller communication device 102A, for audible output thereon. At step 404, the message manager of the caller communication device 102A receives one or more audible messages.

At step 405, message manager 290 may instruct the processor of the communication device 102A to silence the telephone tone such that the audible message is heard instead, and the audible message is outputted on the caller communication device 102A in lieu of the telephone tone.

At step 406, output duration monitor 282 detects the duration parameter for the audible message played until the tone detector interface 206 no longer detects the telephone tone, such as when the user aborts the attempted call, or the call is answered by the call recipient, or after a pre-determined number of ring equivalents.

Referring still to FIG. 4, at step 407, output duration monitor 282 provides the duration parameter for the audible message played to billing system 114. At step 408, billing system 114 determines compensation based on the message duration and other message usage parameters provided by the message usage monitor 180, for the benefit of the account of caller communication device 102A.

In one embodiment, the caller communication device 102A may also comprise a wired or fixed landline telephone coupled to a telephone exchange or switchboard 112 as depicted in FIG. 1. Typically, telephone switchboard 112 is detects when the caller communication device 102A is in an off-hook mode and provides an off-hook telephone tone, prior to dialing a recipient number and attempting a call connection. In such a case, message manager 290 may instruct the processor of the communication device 102A to silence the telephone tone such that the audible message is heard instead, and the audible message may be outputted on the caller communication device 102A in lieu of the off-hook tone.

Again with reference to a wired or fixed landline caller communication device 102A, once the user begins to dial the digits of a recipient telephone number on a keypad of the telephone, the off-hook tone is stopped, for each number or symbol of a telephone keypad that is pressed, dual tone multiple frequencies (DTMF) tones are generated and heard at caller communication device 102A. The DTMF tones generally consist of two pure frequencies and are used for telephone signalling between the switchboard and the caller communication device 102A. In such a case, again message manager 290 may instruct the processor of the communication device 102A to replace the DTMF tone with one or more audible messages, such that the audible message(s) may be outputted on the caller communication device 102A in lieu of the DTMF tones. It is contemplated that a separate audible message, possibly in form of a "jingle", may be retrieved and outputted at caller communication device 102A in lieu of each DTMF tone that would have been generated by dialing each digit.

In the case of wireless communication devices, such as digital communication-based mobile phones, no DTMF tones are generated when a user manually dials digits of a recipient number. The user may however, hear a "spoofed" DTMF tone as each key representing a digit of the recipient telephone number is depressed. Here, again message manager 290 may instruct the processor of the caller communication device 102A to replace the spoofed DTMF tone, detected by tone detector interface 206, with one or more audible messages, such that the audible message(s) may be outputted on the caller communication device 102A in lieu of the spoofed DTMF tones. Again, it is contemplated that a separate audible message, possible in form of a "jingle", may be retrieved and outputted at caller communication device 102A in lieu of each spoofed DTMF tone that would have been generated by dialing a digit.

A user may also attempt a call activation action, such as selecting a speed dial key associated with the recipient phone number, or perform a search from among entries listed in an address book application of the caller communication device 102A. In such cases, message manager 290 may also be applied, after tone detector interface detects such call activation action, to retrieve audible message(s) for outputting on the caller communication device 102A.

Although certain embodiments have been described herein, it will be understood by those skilled in the art that variations may be made thereto without departing from the scope of the appended claims.

What is claimed is:

1. A computer implemented method for monitoring message usage on a communication device, the communication device configured to output a customized number of rings for an incoming call, the method comprising:
   replacing each ring of the customized number of rings with a separate, different audible message for an incoming call at the communication device thereby outputting different messages for a single incoming call;
   receiving an acknowledgement of user attention at a user interface of the communication device during the outputting;
   determining a duration parameter of the outputting; and
   providing the duration parameter and acknowledgment information for determining a compensation parameter.

2. The method of claim 1 further comprising receiving the audible messages from a remote server for output on the communication device.

3. The method of claim 1 wherein the audible messages are outputted at least until detection of a voice response.

4. The method of claim 1 wherein the communication device is configured to receive an incoming call.

5. The method of claim 1, further comprising:
   detecting location information during the outputting; and
   providing the location information for determining the compensation parameter at least partly based thereon.

6. The method of claim 5, further comprising:
outputting the audible messages in a local language depending on the location information.

7. The method of claim 1, further comprising:
detecting mobility information indicating whether the communication device is stationary or moving; and
providing mobility information for determining the compensation parameter at least partly based on the mobility information.

8. The method of claim 1 wherein the audible messages comprises audible advertising messages.

9. The method of claim 1 wherein the audible messages are outputted in a language selectable at the communication device.

10. The method of claim 1 wherein the ones of audible messages comprise separate commercial messages.

11. A communication device comprising:
a processor and a memory coupled thereto, the memory storing instructions and data configuring the processor to:
replace each ring of a customized number of rings with a separate, different audible message for an incoming call at the communication device thereby to output different messages for a single incoming call;
receive an acknowledgement of user attention at a user interface of the communication device during the output;
determine a duration parameter of the output; and
provide the duration parameter and acknowledgement information for determining a compensation parameter.

12. The communication device of claim 11, wherein the communication device is selected from the group of communication devices consisting of a wireless communication device, a landline telephone and a voice-enabled laptop computer.

13. A non-transitory computer readable memory comprising instructions, which, when executed on a communication device, cause the communication device to:
replace each ring of a customized number of rings with a separate, different audible message for an incoming call at the communication device thereby to output different messages for a single incoming call;
receive an acknowledgement of user attention at a user interface of the communication device during the output;
determine a duration parameter of the output; and
provide the duration parameter and acknowledgement information for determining a compensation parameter.

14. A computer implemented system for monitoring message usage on a communication device, the system comprising:
a message database accessible to the communication device for replace each ring of a customized number of rings with a separate, different audible message for an incoming call at the communication device thereby outputting different messages for a single incoming call, the communication device comprising:
a telephone tone detector interface for detecting a ring tone generated at the communication device;
a user interface to receive an acknowledgement of user attention during the outputting; and
an output duration monitor for determining a duration parameter of the outputting; and
a billing system for determining a compensation parameter at least partly based on the acknowledgement and the duration parameter.

15. The system of claim 14 wherein the communication device is configured to receive an incoming call.

16. The system of claim 14 wherein the audible messages are outputted in a language selectable at the communication device.

17. The system of claim 14 wherein the ones of audible messages comprise separate commercial messages.

18. The system of claim 14 wherein the duration parameter is responsive to a number of the customized number of rings.

19. The method of claim 1 wherein the step of determining a duration parameter is responsive to a number of the customized number of rings.

* * * * *